United States Patent
Abrams et al.

(10) Patent No.: US 9,282,014 B2
(45) Date of Patent: *Mar. 8, 2016

(54) SERVER RESTART MANAGEMENT VIA STABILITY TIME

(71) Applicant: International Business Machines Corporation, Armonk, NY (US)

(72) Inventors: Robert M. Abrams, Wappinger Falls, NY (US); Nicholas C. Matsakis, Poughkeepsie, NY (US); Daniel Nieves, Poughkeepsie, NY (US); Anthony T. Sofia, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

This patent is subject to a terminal disclaimer.

(21) Appl. No.: 13/747,887

(22) Filed: Jan. 23, 2013

(65) Prior Publication Data

US 2014/0207938 A1      Jul. 24, 2014

(51) Int. Cl.
| | |
|---|---|
| *G06F 15/173* | (2006.01) |
| *H04L 12/26* | (2006.01) |
| *H04L 29/08* | (2006.01) |
| *G06F 11/07* | (2006.01) |
| *G06F 11/30* | (2006.01) |
| *G06F 11/34* | (2006.01) |

(52) U.S. Cl.
CPC ........ *H04L 43/0811* (2013.01); *G06F 11/0793* (2013.01); *G06F 11/3031* (2013.01); *G06F 11/3051* (2013.01); *H04L 29/08099* (2013.01); *G06F 11/3409* (2013.01); *G06F 11/3419* (2013.01); *G06F 2201/815* (2013.01)

(58) Field of Classification Search
CPC ...................... H04L 29/08099; H04L 43/0811
See application file for complete search history.

(56) References Cited

U.S. PATENT DOCUMENTS

| | | | |
|---|---|---|---|
| 7,043,505 B1 | 5/2006 | Teague et al. | |
| 7,152,185 B2* | 12/2006 | Srivastava et al. | 714/24 |
| 7,486,083 B2* | 2/2009 | Manning et al. | 324/537 |
| 7,523,086 B1 | 4/2009 | Teague et al. | |
| 7,684,959 B2* | 3/2010 | Garzia et al. | 702/182 |

(Continued)

FOREIGN PATENT DOCUMENTS

JP          10260851 A         9/1998

OTHER PUBLICATIONS

Topic: "A study of service reliability and availability for distributed systems" of Y.S. Dai Published on Sep. 7, 2002.*
Dai et al, "A Study of Service Reliability and Availability for Distributed System", Reliability Engineering and System Safety, Elsevier, 2002, 10 pages.

(Continued)

*Primary Examiner* — Umar Cheema
*Assistant Examiner* — Anh Nguyen
(74) *Attorney, Agent, or Firm* — Cantor Colburn LLP; William A. Kinnaman, Jr.

(57) ABSTRACT

A computer system is configured to monitor server stability based on a stability time specification of a server. An embodiment specifies a stability time for the server, wherein the stability time is defined as a time between a starting state of the server and a stability point of the server. The server activity is monitored by an availability manager to determine an availability status of the server. Responsive to the server activity progressing to the stability point within the stability time, an embodiment determines that the server is stable. Responsive to the server activity failing to progress to the stability point within the stability time, an embodiment determines that the server is unreliable.

7 Claims, 6 Drawing Sheets

(56) References Cited

U.S. PATENT DOCUMENTS

| | | | |
|---|---|---|---|
| 7,761,745 B2* | 7/2010 | Garbow | 714/47.2 |
| 7,853,960 B1 | 12/2010 | Agesen et al. | |
| 2007/0050768 A1 | 3/2007 | Brown et al. | |
| 2008/0028399 A1 | 1/2008 | Gupta et al. | |
| 2009/0171704 A1 | 7/2009 | Bobak et al. | |
| 2010/0333089 A1 | 12/2010 | Talwar et al. | |
| 2011/0320633 A1 | 12/2011 | Burmester et al. | |
| 2013/0055034 A1* | 2/2013 | Qiu et al. | 714/47.1 |
| 2014/0249687 A1* | 9/2014 | Ogawa et al. | 700/297 |

OTHER PUBLICATIONS

Thirukonda, et al, "Webspy: An Architecture for Monitoring Web Server Availability in a Multi-Platform Environment", Informing Science, v.5, n.4, 2002, pp. 175-187.

Dong Tang et al, "Availability Measurement and Modeling for an Application Server", Proc. of the 2004 Int'l. Conf. on Dependable Systems and Networks (DSN'04), IEEE Computer Society, 2004, 10 pages.

Srinivasan, et al, "Specifying Non-Functional Requirements for Real-Time Systems", ISCA-2009, 2009, 6 pages.

* cited by examiner

SERVER RESTART MANAGEMENT VIA STABILITY TIME

BACKGROUND

The present invention relates to server stability, and more specifically, to monitoring server stability based on a stability time specification of the server.

In the contemporary art, a virtual server is a virtual machine hosted by a hypervisor. A single server machine may host many virtual servers, where each virtual server represents a share of computer resources, such as central processing unit (CPU), memory, and storage resources, and hosts a separate operating system (OS) image. The OS image executes middleware and business applications, and can be operated and rebooted independently from other virtual servers.

Typically, a collection of managed virtual servers, such as a Workload Resource Group (WRG), include virtual servers of different architectures, all working together to execute a business workload. The OS image on each virtual server may provide some value-added contribution to the overall business workload. Contemporary computing environments detect the failure of a virtual server and restart the virtual server "in place." In other words, the failing virtual server is terminated and restarted, often on the same system, virtual server, or in the same virtual machine. A set of redundant virtual servers is typically defined to process the same business functions as the failing virtual server and take over in case of restart or failure.

SUMMARY

According to an embodiment, a computer system is configured to monitor server stability based on a stability time specification of a server. An embodiment specifies a stability time for the server, wherein the stability time is defined as a time between a starting state of the server and a stability point of the server. The server activity is monitored by an availability manager to determine an availability status of the server. Responsive to the server activity progressing to the stability point within the stability time, an embodiment determines that the server is stable. Responsive to the server activity failing to progress to the stability point within the stability time, an embodiment determines that the server is unreliable.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein determine the stability and availability status of a server by monitoring the stability time specification of the server. According to embodiments, the stability time is specified for the server. The stability time is defined as the time between a starting state of the server and the stability point of the server. An availability manager of embodiments monitors the server activity to determine an availability status of the server. In response to the server activity progressing to the stability point within the stability time, embodiments determine that the monitored server is stable. In response to the server activity failing to progress to the stability point within the stability time, embodiments determine that the server is unreliable, without knowledge of the specific OS or other processing running in the virtual server.

Contemporary computing environments typically detect the failure of a process or server and restart that process "in place". In other words, the failing server is terminated and restarted, often on the same system, server, or in the same virtual machine. However, it is possible that restarting the server would result in the server failing again, or taking too long to become truly "available" (i.e., ready to process useful work). Restarting the server too soon could cause the server to (1) hang, such that the server's start or restart does not make progress to a full function ready state, (2) fail immediately and subsequently restart, which if unconstrained would result in restart "thrashing", or (3) consistently fail after a period of useful productive work.

Contemporary computing environments typically determine whether a server is stable by monitoring for direct execution errors or related error symptoms exhibited by the server environment. The contemporary approach focuses primarily on rich levels of error detection in the OS and other hosted processing, and requires detailed observations of the monitored servers. While a wealth of architecture and OS specific error data can be collected, it may not be available, especially if the hosted virtual servers and OS images are not instrumented to provide such information.

Embodiments disclosed herein provide a stability time as the time to reach a stability point in the initialization of the virtual server. An availability manager observes the execution of servers among a collection of different server architectures and determines server stability by monitoring whether the server remains active long enough to be considered reliable. When the server reaches the stability point, the server is available for use in business workloads and is no longer considered a potentially unreliable part of the workload.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
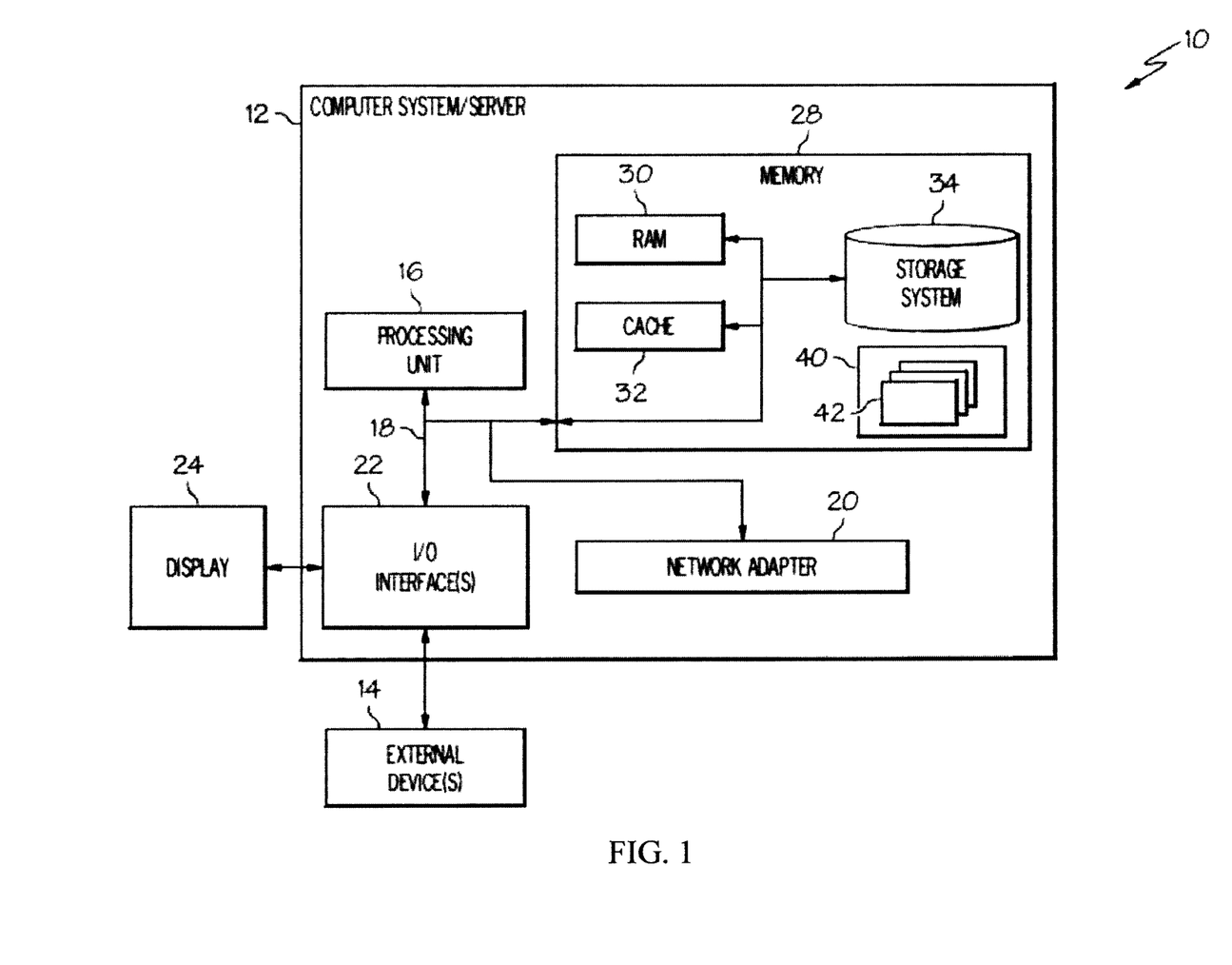
FIG. 1 depicts a cloud computing node according to an embodiment of the present invention.

Referring now to FIG. 1, a block diagram of a cloud computing node for collectively aggregating digital recordings of an event of an embodiment is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "flash drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
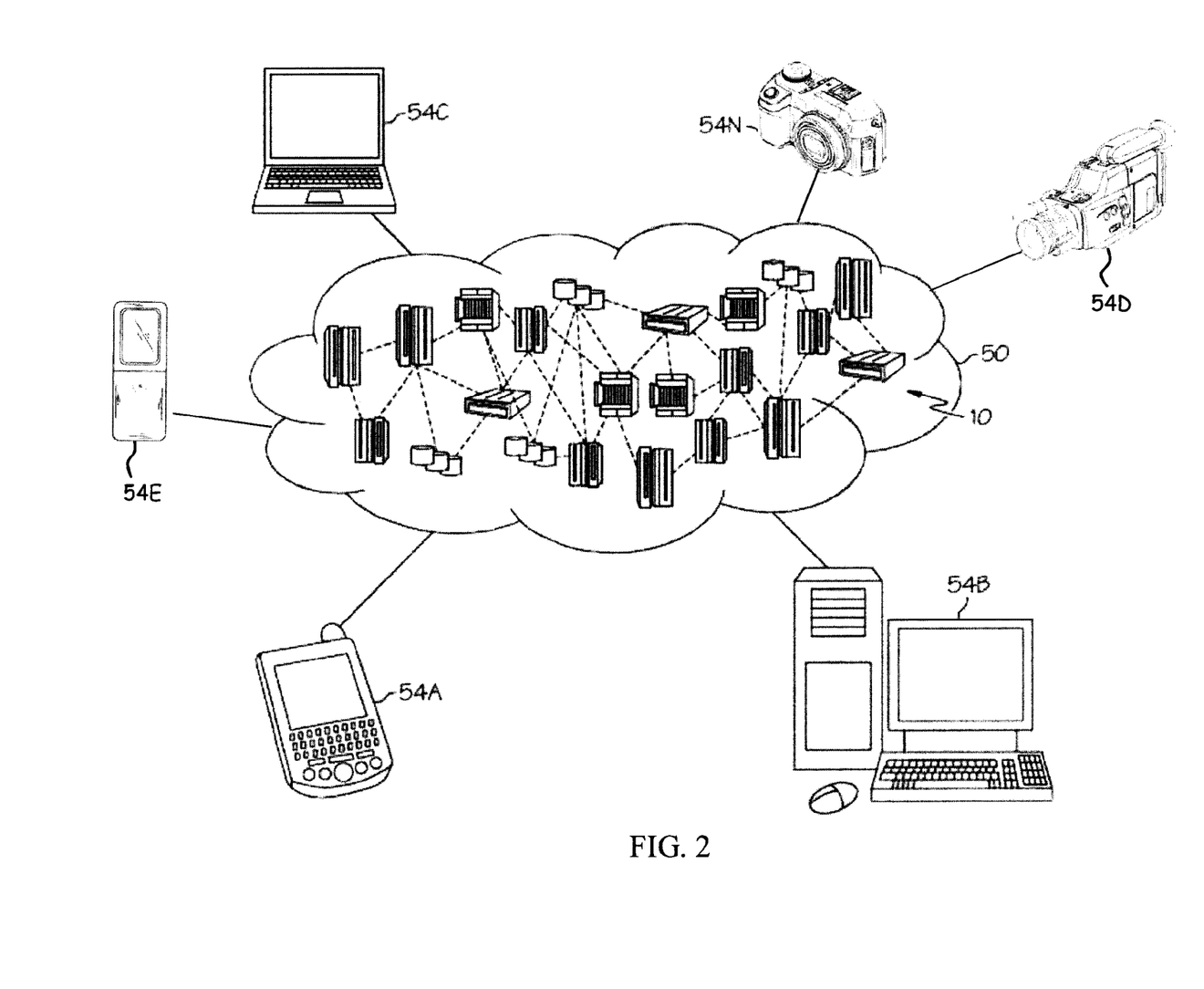
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
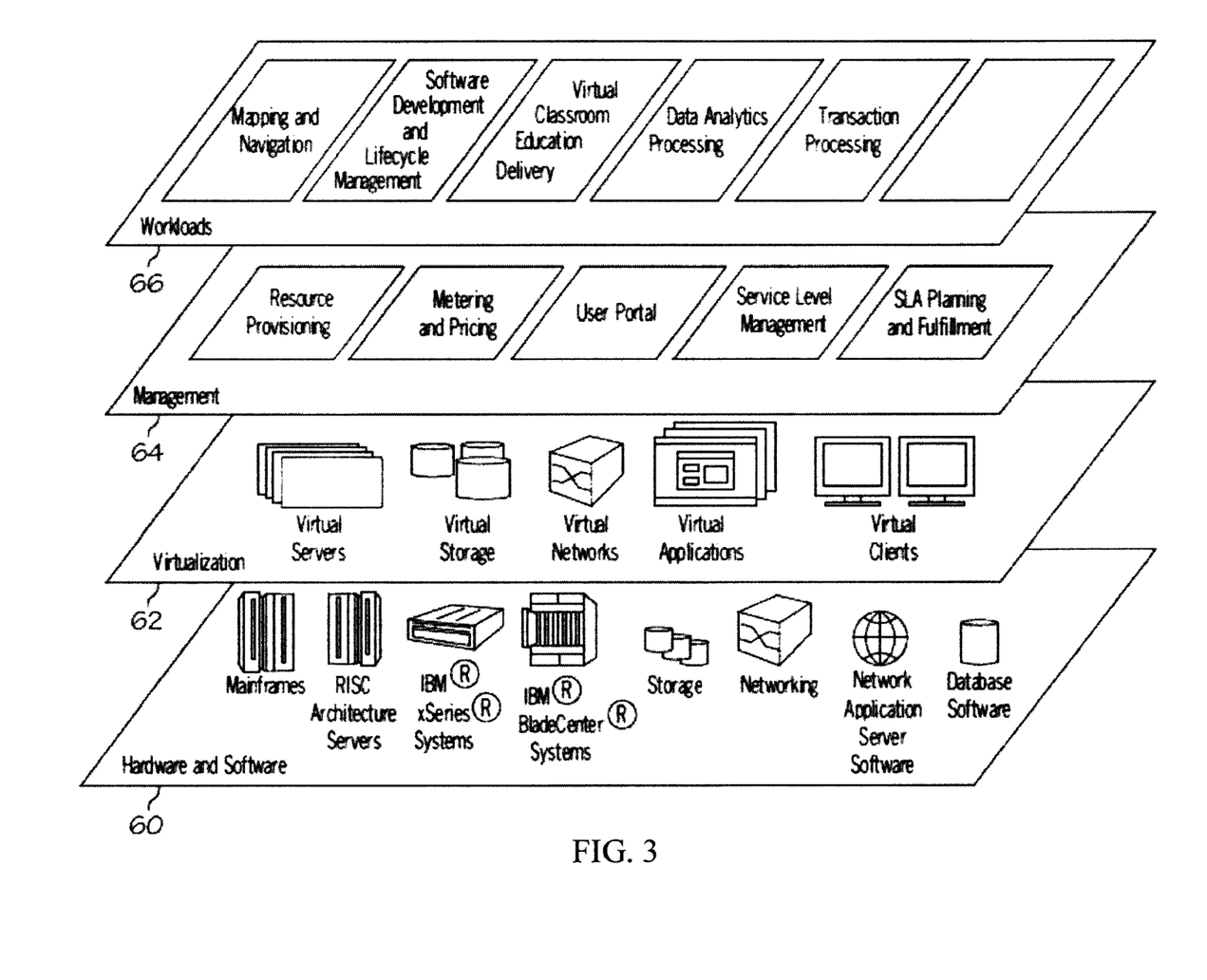
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation, automation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
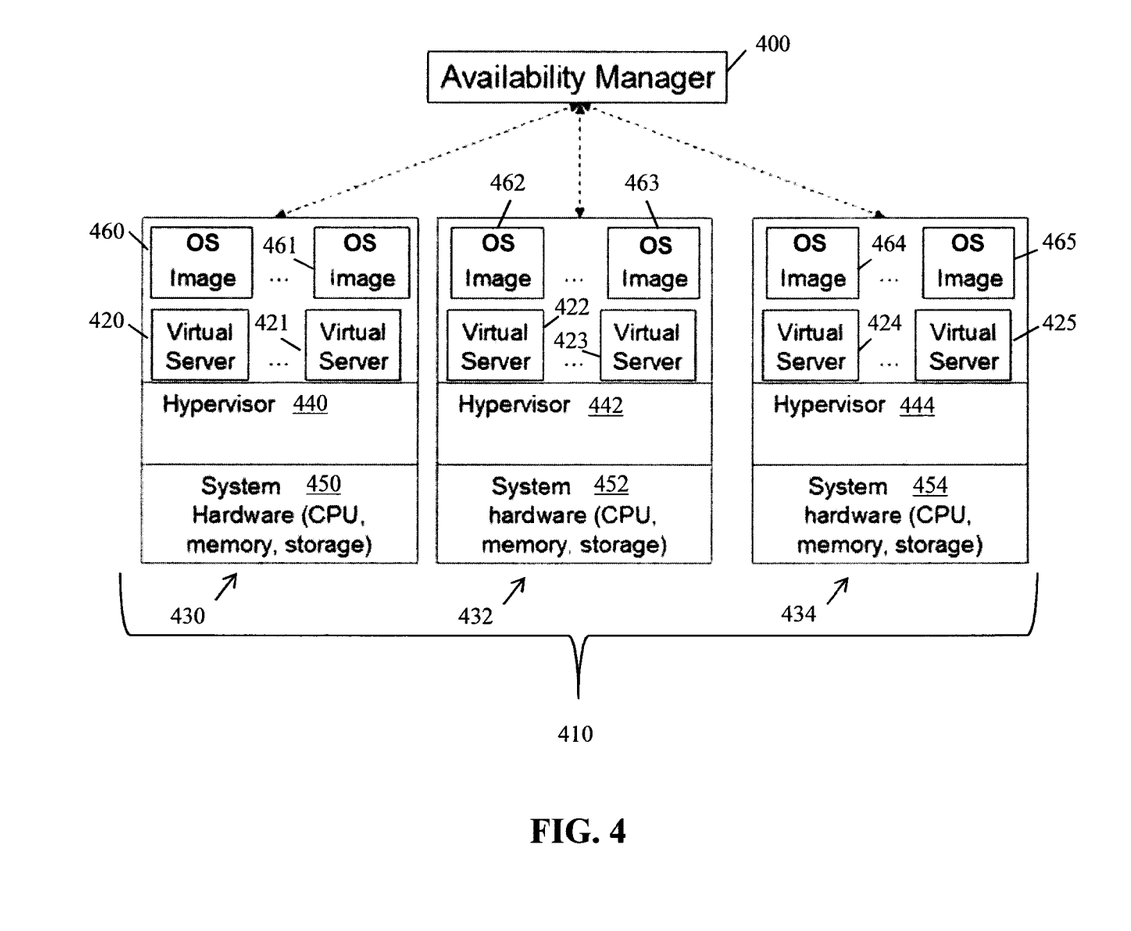
FIG. 4 depicts an availability manager of a workload resource group (WRG) according to an embodiment.

With reference now to FIG. 4, an availability manager 400 of a workload resource group (WRG) 410 according to an embodiment is shown. An availability manager of an embodiment monitors activity running on each virtual server 420, 421, 422, 423, 424, 425 on behalf of a WRG 410 and determines the availability status of the WRG 410 and its corresponding virtual servers 420, 421, 422, 423, 424, 425. For example, an availability status of a virtual server or WRG may be represented as "Available", "Exposed", "Critical", "Not Available", and "Unreliable." Each physical server 430, 432, 434 hosts one or more hypervisors 440, 442, 444. Each hypervisor hosts one or more virtual servers 420, 421, 422, 423, 424, 425. Each virtual server 420, 421, 422, 423, 424, 425 represents a share of system hardware resources 450, 452, 454, as supported by each virtualization container, such as CPU, memory, and storage resources, and hosts separate OS images 460, 461, 462, 463, 464, 465. The OS images 460, 461, 462, 463, 464, 465 execute business applications, and can be operated and rebooted independently from other virtual servers. The physical systems 430, 432, 434 are examples of compute nodes 10, as shown in FIG. 2 of an embodiment.

Figure 5:
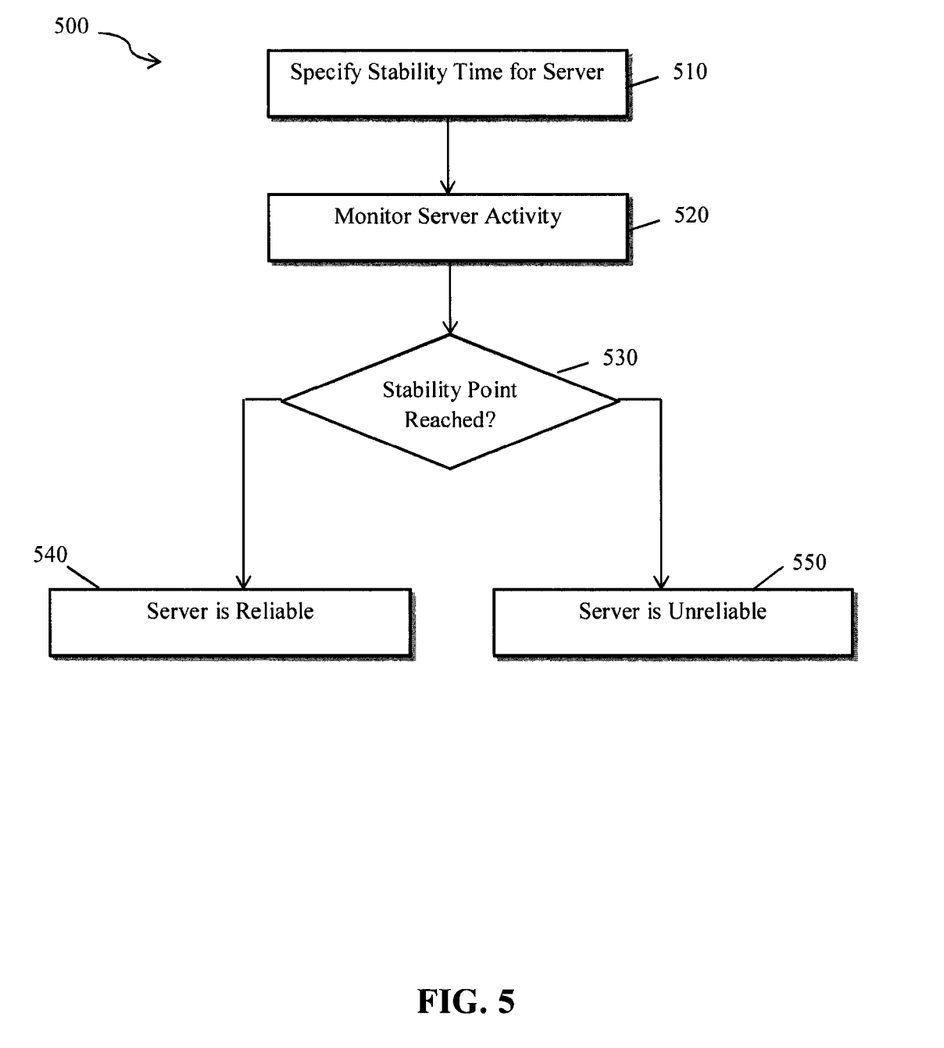
FIG. 5 depicts a flow diagram of a monitoring operation for determining the stability of a server based on a stability time specification of the server according to an embodiment.

Referring to FIG. 5, a flow diagram of a monitoring operation 500 for determining the stability of a server based on a stability time specification of the server according to an embodiment is shown.

In block 510, a stability time is specified for a server. According to an embodiment, the stability time is defined as the time between a starting state of the server and a stability point of the server. The stability time may be specified during virtual server configuration or may be determined automatically by the system of an embodiment. The stability time value may be specified in an external policy or internally interpreted but displayed in external reports. Automated determination of the stability point is accomplished by determining how long the virtual server remained functional over a historical period of time. For example, a server that is normally available for long periods of time would have a higher availability time as it is expected to be stable for longer periods of time. The stability time of an embodiment is used to determine the execution time from the last start or restart of a virtual server until when execution has reached a stability point to establish that the server is stable and reliable.

Before restarting the server for a subsequent failure, the stability time of an embodiment provides the amount of time that must pass after an availability manager restarts the server. According to an embodiment, the availability manager does not restart the server if a failure is observed when the server has executed for less than the stability time. This prevents non-corrected problem from causing repetitive restart thrashing by ensuring that a subsequent restart of a restarted virtual server after failure will not occur until after the stability time has expired. According to another embodiment, the availability manager would restart the server even if the startup time is within the stability time period. However, the instability of the server would be marked in its availability status and an overall limit on number of attempts without reaching the stability time would be the limiting factor.

According to another embodiment, the stability time may also be used to determine an abnormal startup time issue, such as a hang or poor performance during startup. This is determined in response to a started or restarted server not reaching a stability point within the stability time period. Accordingly, if the initialization of the server is taking too long to become available or experiencing a hang situation, an embodiment prevents the server from executing desired workloads due to its instability.

In block 520, the availability manager monitors server activity to determine the stability and availability status of the server according to an embodiment. The availability monitor of an embodiment determines the stability of servers by observing whether each server is executing by reaching one or more stability points within the specified stability time for that type of server. In other words, the availability manager observes each virtual server to determine the time it takes to start the server to the point that the server is ready to process work. For example, virtual servers that are considered stable may have been processing work for a significant period of time (e.g., 30 minutes) before being considered stable. According to an embodiment, the availability status of each server is selected from a group including an available state, exposed state, a critical state, a not available state, and an unreliable state.

According to an embodiment, an agent running in each hosted operating system may further evaluate and represent the execution progress and availability status of each virtual server, such as when the image is ready for work, to the availability manager. For example a web server is not represented as operating until an HTTP response is received on port 80, contrary to contemporary methods that just "ping" the server to see if it is available. This event is considered the stability point for the web server according to an embodiment.

In block 530, the availability manager determines whether a stability point for the observed server has been reached within the specified stability time. In response to the server activity progressing to the stability point within the stability time, the availability manager determines that the server is stable according to an embodiment, as shown in block 540. In response to the server activity failing to progress to the stability point within the stability time, the availability manager determines that the server is unreliable according to an embodiment, as shown in block 550.

Figure 6:
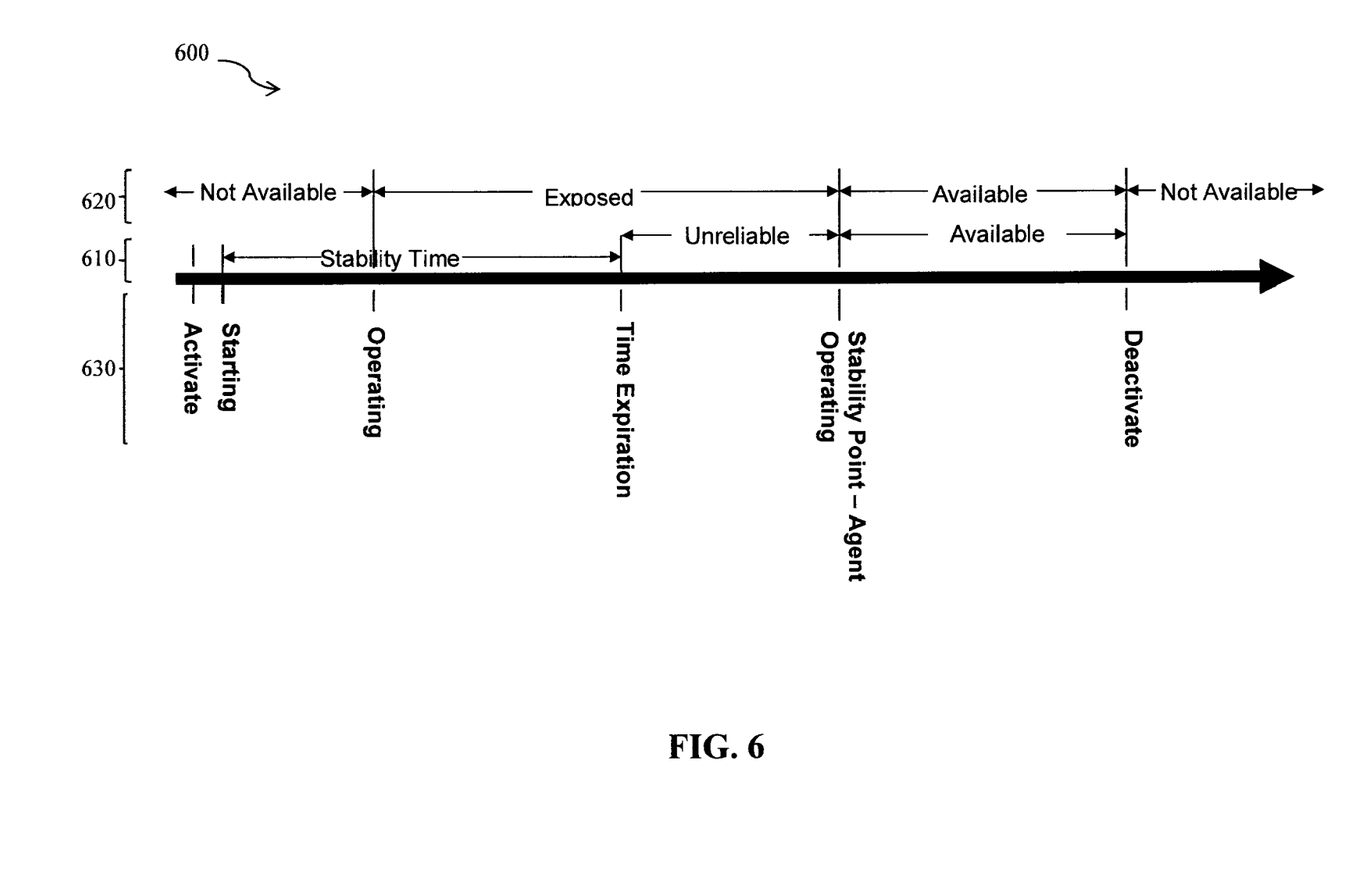
FIG. 6 depicts a timeline demonstrating the relation between a stability time, an availability status, and a lifecycle of a server according to an embodiment.

FIG. 6 depicts a timeline 600 demonstrating the relation between a stability time 610, an availability status 620, and a lifecycle of the server 630 according to an embodiment. The virtual server is activated via a programmable request or user request via a user interface. Shortly thereafter, the virtual server enters the starting state. At this point the availability manager can start monitoring the progress of the started virtual server. Normally, the virtual server environment (i.e., the virtual machine) will initialize and switch to the operating state. The availability status 620 of the virtual server is designated as "Not Available" up to the operating state. However, the OS image has yet to start. Accordingly, the availability status 620 of the virtual server is designated as "Exposed" up until the OS is fully stable. When the OS has reached a point considered stable enough to process work (i.e., the stability point), the firmware agent signals the availability manager accordingly and the availability status 620 of the virtual server is designated as "Available".

At some point in the life of the virtual server, the virtual server will eventually be deactivated, for example, to allow for maintenance or to free orphaned memory. Accordingly, the availability status 620 of the virtual server is designated as "Not Available" after deactivation. Additionally, FIG. 6 further depicts a situation where the stability time 620 of the virtual server has expired before reaching the stability point, or has failed and restarted during the stability time interval 610. Accordingly, the virtual server in this situation is unreliable because the stability point was never reached within the stability time.

Embodiments of the stability time may be used to monitor multiple server architectures across all architectures in the multi-platform environment. Additionally, separate stability times may be established for each architecture or virtual server application along with a corresponding stability point. The stability point may be one or more indicators identified by an agent running in the corresponding OS image.

When focusing on the stability of different types of server architectures, it may be difficult to a choose a single stability time to prevent restart thrashing, as different server architectures may have different availability characteristics. However, an embodiment provides the estimation of expected stability times for different types of workloads running on specific types of servers. For example, a mainframe server may be available for days, if not months. Accordingly, an embodiment may set a stability time of one hour because if the mainframe fails twice within that time frame, then separate diagnostics and maintenance may be required.

According to an embodiment, the server may still be restarted if the elapsed time is shorter than the stability time. In that case, however, the server is restarted and marked as "unreliable" to indicate that it was an exception condition resulting in the server being restarted outside of the stability time specification to restore availability to the WRG. Servers in some system architectures may be expected to fail frequently and restarted thereafter. An embodiment addresses this situation by specifying a lower stability time, such as 30 minutes. It is possible that the installation considers this manageable by configuring a large number of redundant peers in order to keep the overall function available during times when servers are recycling. Stability time applies to a configured group of redundant servers as well as dedicated servers in a WRG.

Embodiments disclosed herein provide a stability time and stability points to an availability manager to monitor the availability of virtual servers executing on multiple servers belonging to different architectures, as well as monitor work executing in a single type of server environment. The stability time is used to determine normal availability characteristics of servers to assist in meeting recovery time objectives (RTO). Servers that are naturally not stable may be assigned lower stability times, but also require higher levels of redundancy in order to meet the overall RTO. Accordingly, embodiments assist in providing guidance to a customer with regard to how much redundancy would be required. Embodiments can be used by any availability manager, whether it is monitoring firmware components, operating system components, automation or the application layer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system, comprising:
a processor, a system memory, and a bus that couples various system components including the system memory to the processor, the system configured to perform a method comprising:
specifying, by a processing device, a stability time for a server, the stability time defining a time between a starting state of the server and a stability point of the server, the stability time being used to determine availability characteristics of the server to assist in meeting a recovery time objective, the stability point of the server includes when an operating system of the server has reached a point considered stable so that the server can process work;
monitoring, by an availability manager, server activity to determine an availability status of the server;
determining that the server is stable in response to the server activity progressing to the stability point within the stability time; and
determining that the server is unreliable in response to the server activity failing to progress to the stability point within the stability time.

2. The computer system of claim 1, wherein the server is marked as unreliable in response to the server being restarted prior to progressing to the stability point.

3. The computer system of claim 1, wherein the availability manager prevents the server from restarting until the stability time has expired to prevent thrashing.

4. The computer system of claim 1, further comprising an agent of the server, the agent evaluating and reporting the server activity to the availability manager.

5. The computer system of claim 1, wherein the stability time is specified during server configuration and is based on a determination of server functionality over a historical period of time.

6. The computer system of claim 1, wherein the availability status of the server is selected from a group comprising an available state, an exposed state, a critical state, a not available state, and an unreliable state.

7. The computer system of claim 6, wherein the exposed state is defined as a time between an operating state of the server to the stability point of the server.

* * * * *